United States Patent [19]

Jackson

[11] Patent Number: 5,043,927

[45] Date of Patent: Aug. 27, 1991

[54] DIGITAL SIGNAL QUALITY ANALYSIS USING SIMULTANEOUS DUAL-THRESHOLD DATA ACQUISITION

[75] Inventor: Ronald M. Jackson, Portland, Oreg.

[73] Assignee: Tektronix, Inc., Beaverton, Oreg.

[21] Appl. No.: 409,179

[22] Filed: Sep. 18, 1989

[51] Int. Cl.$^5$ ............................................. G01R 17/00
[52] U.S. Cl. ................................ 364/551.01; 364/574; 324/77 A
[58] Field of Search .................. 324/77 A, 121 R; 364/484–486, 487, 551.01, 572, 574

[56] References Cited

U.S. PATENT DOCUMENTS

| | | | |
|---|---|---|---|
| 4,129,827 | 12/1978 | Southwick | 324/77 A |
| 4,499,419 | 2/1985 | Bockett-Pugh | 324/77 A |
| 4,730,157 | 3/1988 | Lepetit et al. | 324/77 A |
| 4,823,076 | 4/1989 | Haines et al. | 324/121 |
| 4,876,655 | 10/1989 | Carlton et al. | 324/77 A |

Primary Examiner—Salvatore Cangialosi
Attorney, Agent, or Firm—Boulden G. Griffith; Francis I. Gray

[57] ABSTRACT

A method for performing signal quality analysis on digital signals uses simultaneous dual threshold data acquisition. Using this method, the data need not be repetitive and, because the reference data and the variable data are acquired simultaneously, the logic analyzer continues to trigger and further measurements can be made after significant noise has been encountered. One threshold is designated the reference threshold and used to perform triggering and acquisition of reference data, while the other threshold is designated the variable threshold and used to acquire data for the noise margin analysis. At each increment of variable level, the data acquired by the reference acquisition and the data acquired using the variable threshold level is compared to see at what point in time and on what signal lines noise begins to affect the quality of the data. These data comparisons should be tolerant of minor timing variations that arise from the interaction of normal rise and fall times and the varying threshold level, and yet be sensitive to more significant changes in the data that arise from the effects of noise, marginal signal width or amplitude, or excessive rise and fall times.

25 Claims, 4 Drawing Sheets

5,043,927

DIGITAL SIGNAL QUALITY ANALYSIS USING SIMULTANEOUS DUAL-THRESHOLD DATA ACQUISITION

BACKGROUND OF THE INVENTION

This invention relates to the field of signal quality analysis in a digital data acquisition instrument, and more particularly to the field of digital signal quality analysis in a logic analyzer using simultaneous dual-threshold data acquisition.

Some classes of digital data acquisition instruments, e.g., logic analyzers, periodically compare signals under test to a reference threshold in order to determine whether they are in a logical high or a logical low state at each sample time. Some of the more modern of these instruments offer a means for an operator to simultaneously compare the signal under test with two thresholds instead of one. The usual use for such a "dual threshold" capability is to detect signals that are not in either logic state, high or low, but rather in the region of uncertainty between logic levels.

In digital systems it is useful to be able to determine the margin between noise on the data lines and the switching threshold of the circuitry being used. One logic analyzer manufacturer, Gould Test & Measurement Inc., has produced a logic analyzer, the K-105-D, that has optional software which automates a form of noise margin analysis using a single threshold. Acquisitions based on the same trigger definition are taken repeatedly while the single threshold is varied incrementally. When differences in the data start to appear, the effects of noise have been detected and the noise margin can be calculated.

One limitation of this type of noise margin analysis is that the data in the system under test must be repetitive. This is so that, before noise is encountered, the data acquired by successive acquisitions is stable and can serve as a reference. Another limitation of single threshold noise margin analysis is that the trigger location may be one of the first things to be affected when noise is encountered. Once noise causes the trigger location to become affected, the reference for aligning the acquisitions is lost and no further detailed analysis of when and where different levels of noise are occurring is any longer possible. Furthermore, this tendency of the trigger location to be lost as a single threshold is changed also limits the additional signal quality measurements that can be made.

What is desired is a method of performing signal quality analysis that can be used on either repetitive or non-repetitive digital data to identify noise and other signal anomalies, such as slow rise and fall times or marginal pulse widths or amplitudes, in a way that permits such analysis to be continued beyond the variable threshold level where noise or other anomalies are initially encountered.

SUMMARY OF THE INVENTION

The present invention is a method of performing signal quality analysis, including the identification of noise, slow rise and fall times, and marginal pulse widths and amplitudes, that uses simultaneous dual threshold data acquisition, thus permitting the analysis to be performed on non-repetitive as well as repetitive digital data and to continue beyond the variable threshold level where anomalies are initially encountered. One threshold is designated as a reference threshold and used to perform triggering and acquisition of reference data, while the other threshold is designated the variable threshold and is used to acquire data for the signal quality analysis. At each increment of variable level, the data acquired by the reference acquisition and the data acquired using the variable threshold level are compared to see at what point in time and on what signal lines noise or other anomalies appear. These data comparisons should be tolerant of minor timing variations that arise from the interaction of normal rise and fall times and the varying threshold level, and yet be sensitive to more significant changes in the data that arise from the effects of noise, marginal signal width or amplitude, or clearly excessive rise and fall times.

It is an object of this invention to be able to perform signal quality analysis on non-repetitive digital data.

It is a further object of this invention to be able to continue signal quality analysis beyond the variable threshold level where the anomalies encountered could adversely affect the ability of the data acquisition instrument to trigger reliably.

It is a feature of this invention that data is acquired simultaneously from both a reference threshold and a variable threshold. The advantage produced by this feature is that both the reference data and the variable data are acquired at the same time so that the data being analyzed need not be repetitive and so that reliable triggering is available from the reference data at all times.

BRIEF DESCRIPTION OF THE DRAWINGS

FIG. 4C is a plot of the distribution of detected anomalies as a function of both the variable threshold voltages at which they were detected and the data channels that they occurred on.

DETAILED DESCRIPTION

Figure 1:
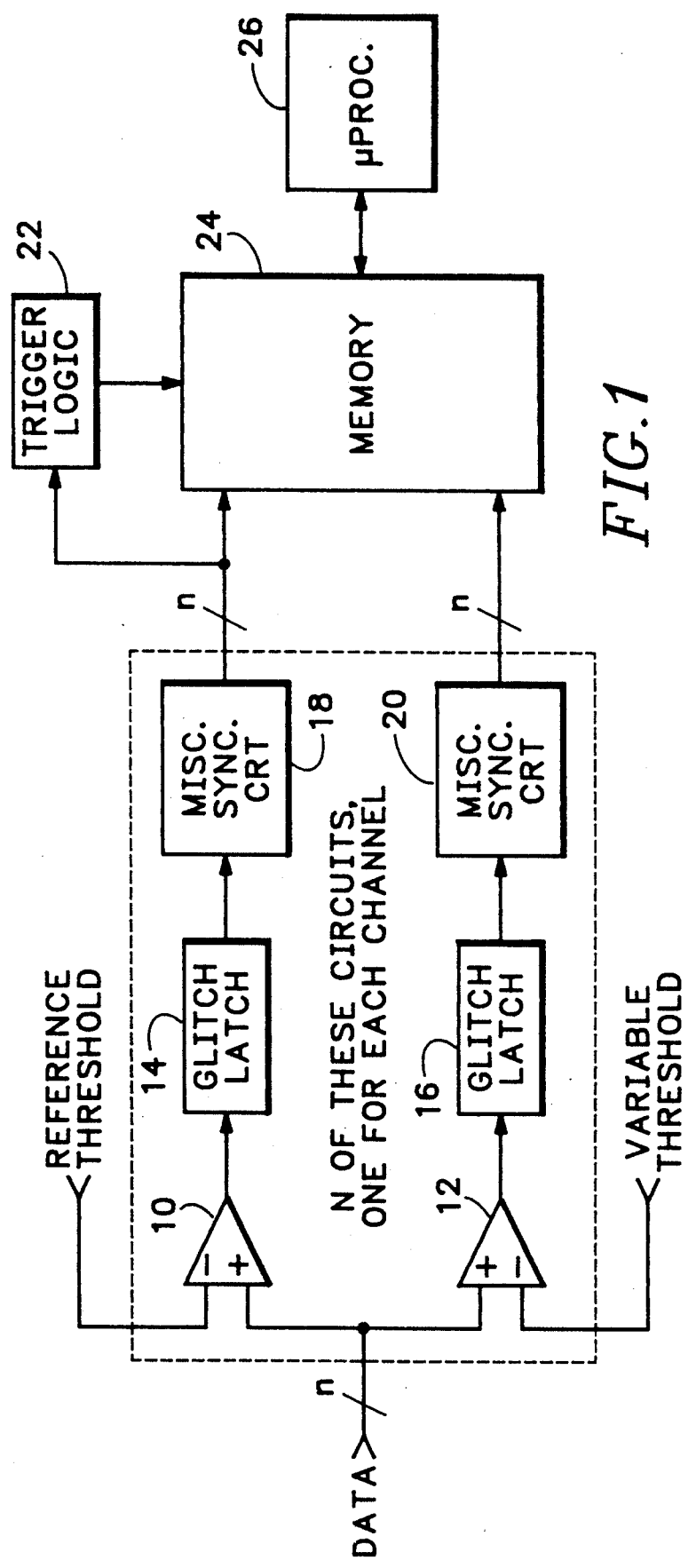
FIG. 1 is a simplified block diagram of a dual threshold acquisition circuit suitable for acquiring data according to the present invention.

Referring to FIG. 1, a data signal is applied to the high side of two comparators 10 and 12. The other side of one of these comparators 10 is supplied with a constant reference threshold level. The other side of the other one of these comparators 12 is supplied with a variable threshold level. Each of the comparators 10 and 12 produces a high output when the data signal voltage level is greater than the threshold level on the other input.

Glitch latches 14 and 16 extend transient crossings of the thresholds to a full period of the acquisition system clock signal. Miscellaneous synchronous circuits 18 and 20, including a number of flip-flops operating off of the acquisition system clock signal, are not shown in detail. This circuitry presents the acquired data to the trigger logic 22 and memory 24 in synchronous form. The dual comparators 10 and 12, the glitch latches 14 and 16, and the miscellaneous synchronous circuitry 18 and 20 are all duplicated for each channel of data to be monitored. $2 \times N$ lines of resulting data are presented to the trigger logic 22 and memory 24.

The trigger logic 22 responds to the appearance of data across multiple data channels that fits a set of pre-programmed criteria. Typically, a logic analyzer acquires a stream of data, storing it in a circular memory, until the trigger condition is met. Then, depending on the trigger location selected, some, none, or all of the memory is further filled before the acquisition of the desired data is completed by ceasing to overwrite the circular memory.

Between each data acquisition, or after acquisitions have been made at all of the variable thresholds, the microprocessor 26 examines each pair of acquired data sets and reaches conclusions about which differences in the data are the result of noise or other anomalies and which differences are the result of normal rise and fall time effects. The threshold levels may be incremented or decremented over a full range of values or a binary search may be used to find the minimum variation in threshold that produces noise or other anomalies using a minimum number of acquisitions. (A binary search involves choosing as the next value the midpoint of the remaining area to be analyzed on each pass.)

Figure 2:
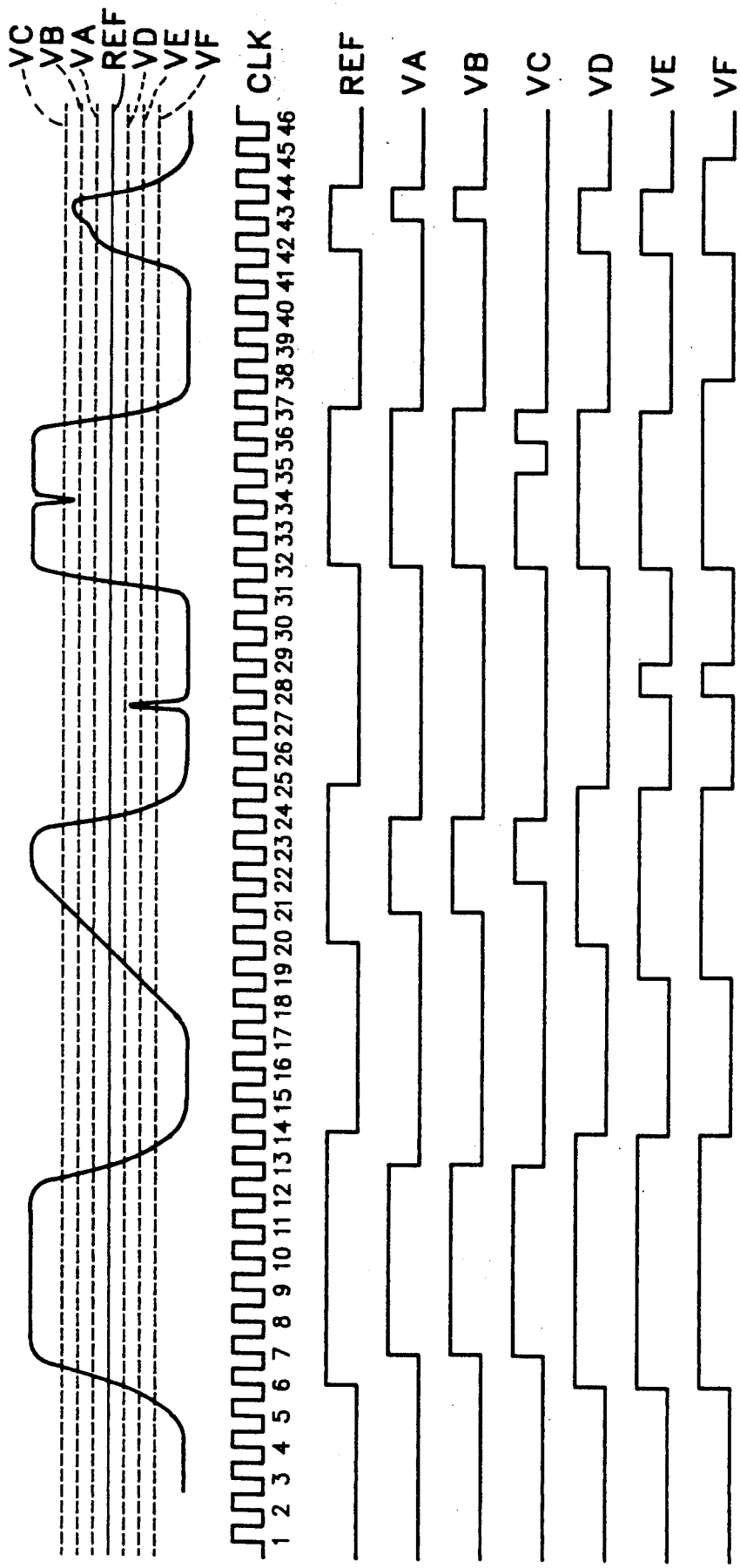
FIG. 2 is timing diagram of an analog view of a digital data signal exhibiting noise, a slow rise time, and a pulse with marginal width and amplitude, and also showing a train of acquisition clock signals, acquired reference data, and six samples of data acquired using a variable threshold.

Referring now to FIG. 2, a noisy digital data signal exhibiting several undesirable properties is shown in amplified detail at the top of this Figure. Immediately below this raw data signal is the acquisition system clock signal. In this example, the rising edge of the clock is the active edge, the one that the acquisition system is synchronized to. The reference threshold level is shown by the solid line through the middle of the raw data signal. A number of variable threshold values are shown as dotted lines through the data signal. The data as it looks when acquired at the reference threshold is shown immediately below the clock signal. Below that are the various data patterns acquired using six variable threshold levels. To simplify this figure, the assumption has been made that the underlying digital data signal was repetitive, so that the same reference data, REF, was acquired simultaneously with each of the variable threshold acquisitions. Such repetitiveness is not necessary to the operation of the invention, but, as will be explained further below, time correlation of different acquisitions may not be possible when non-repetitive data is being examined.

The first rising edge in the raw digital data signal of FIG. 2 is detected in the reference data REF on the rising edge of clock 6 and the falling edge of the same pulse occurs at clock 14. The higher threshold VA does not detect the first rising edge at quite the same time, finding it at clock 7 instead of 6. Similarly, the first falling edge is detected using the threshold VA at clock 13 instead of clock 14. Since these first two edges are examples of satisfactory rise and fall times, the software processing of the data should overlook this type of edge motion and not identify it as any sort of problem. Since any minor change in threshold can be enough to move a transition from one side of a particular clock edge to the other, any change in edge position of only one clock cycle should be ignored. And, in connection with this first pulse, no additional edge motion is detected at any of the other variable thresholds.

The rising edge of the second pulse in FIG. 2 has a slow rise time and should probably be recognized as abnormal. Whether it is depends on how the changes in the data produced by it compare with a user selected value. If the period of the clock signal is 5 ns., and the user has indicated that rise times should not exceed 10 ns., then any edge that changes position by more than two clock periods going from low to high is definitely exhibiting a slow rise time. However, if our data is not repetitive, we only have one side of the transition, the part between the reference threshold and the maximum (or minimum) variable threshold, to base our measurement on. For example, if the data obtained on one non-repetitive pass is REF and VC, the apparent change in edge location is two clock cycles or 10 ns. Even if the worst case assumption is made that the first clock cycle of apparent pulse width change is attributable to a very minor timing change, the second clock cycle of pulse width change means that the underlying data must have changed duration by at least 5 ns. Since we are only measuring half of the rise time between REF and VC, and it was greater than 5 ns, we can know that the total rise time was greater than the 10 ns. specified by the user.

Continuing to refer to FIG. 2, an example of noise occurs between the active edges of clocks 27 and 28. This high-going noise spike is detected by the glitch latch 16 in FIG. 1 during the acquisitions at variable thresholds VE and VF, where it appears as a high during the next clock cycle, 28. Noise always shows up as an increase in the number of pulses in the variable data relative to the reference data. Another example of noise, but one of the opposite polarity, is found between clocks 34 and 35. In this case, when it is detected by variable threshold VC, the effect is to divide a single pulse in the reference data into two pulses in the variable data.

The pulse at clock 43 in the reference data is marginal in amplitude. And, depending upon another user selected value for minimum pulse width, it well might be considered marginal in width as well. If the comparison software is looking for a minimum pulse width of two clock cycles, the pulse at clock 43 will be identified as being a narrow pulse by the data collected using variable threshold VA. And, even if no minimum pulse width has been specified by the user, this pulse will be identified as having marginal amplitude because of the way it entirely drops out of the data collected at variable threshold VC.

As can be seen from the preceding discussion, artful treatment of the data obtained using this technique can yield a variety of useful information. And, as will be seen below, this information can be presented to the user of the instrument in a variety of ways. However, how to process and display this data is not central to the invention that is the subject of this patent. What is central to the invention is the technique of collecting this data, by employing simultaneous acquisition using a reference threshold and a variable threshold, and the recognition that this data contains all of the information necessary to identify noise, marginal pulse widths and amplitudes, and slow rise or fall times.

Figure 3:
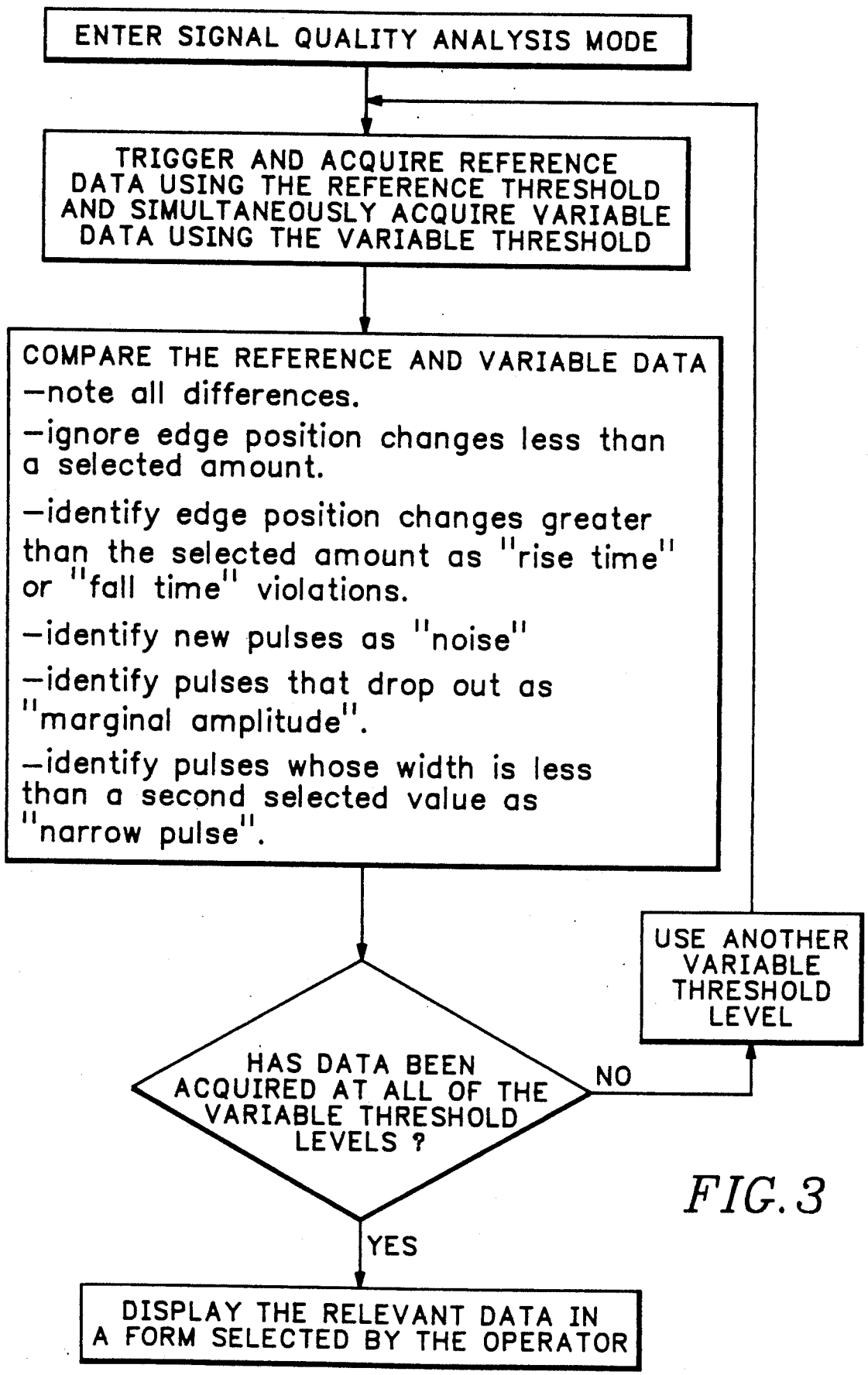
FIG. 3 is a logic flow chart of a procedure for processing the data generated by simultaneous dual threshold data acquisition.

FIG. 3, shows a simplified flow chart of one way this data can be processed. This procedure is somewhat arbitrary, in that the large central block labeled "Compare Reference and Variable Data" could be moved outside of the loop that cycles through the various variable thresholds and all of the processing could be done after all of the data has been acquired and stored. However, if a binary search for the first anomalies is being conducted, the data must be analyzed after each acquisition to determine which direction to go next in the binary search.

The "Compare Reference and Variable Data" block of FIG. 3 contains the basic rules for processing the data acquired according to this invention. The decision block, "Has Data Been Acquired at All of the Variable Threshold Levels?", assumes that all variable threshold levels are to be examined. The alternative is to employ a binary search technique in an effort to locate with as few acquisitions as possible the level at which the first anomalies begin to appear, as is done in single threshold noise margin analysis. Examining all of the variable threshold levels makes available a lot more data.

Figure 4A:
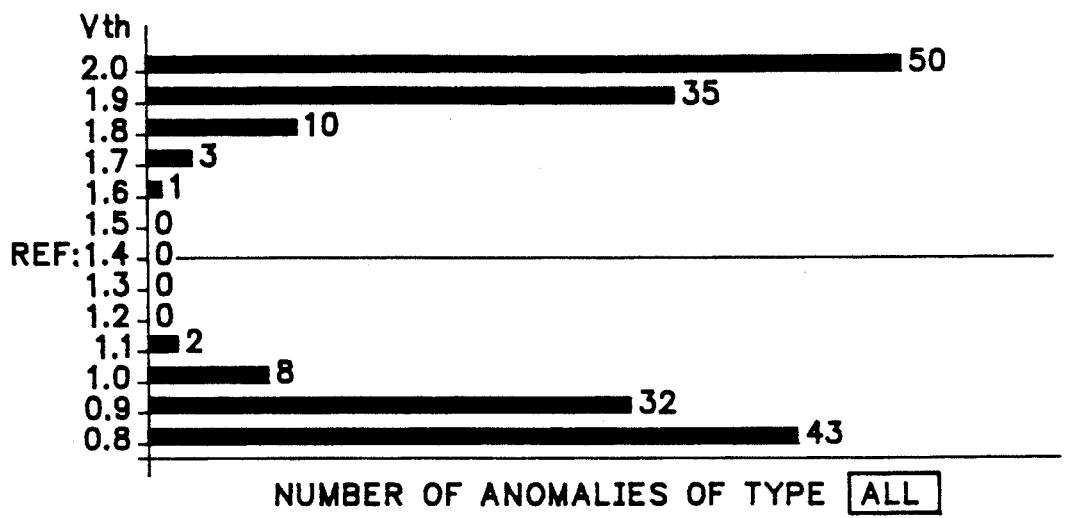
FIG. 4A is an illustration of a histogram display of anomalies as a function of the variable threshold level at which they were detected.
Figure 4B:
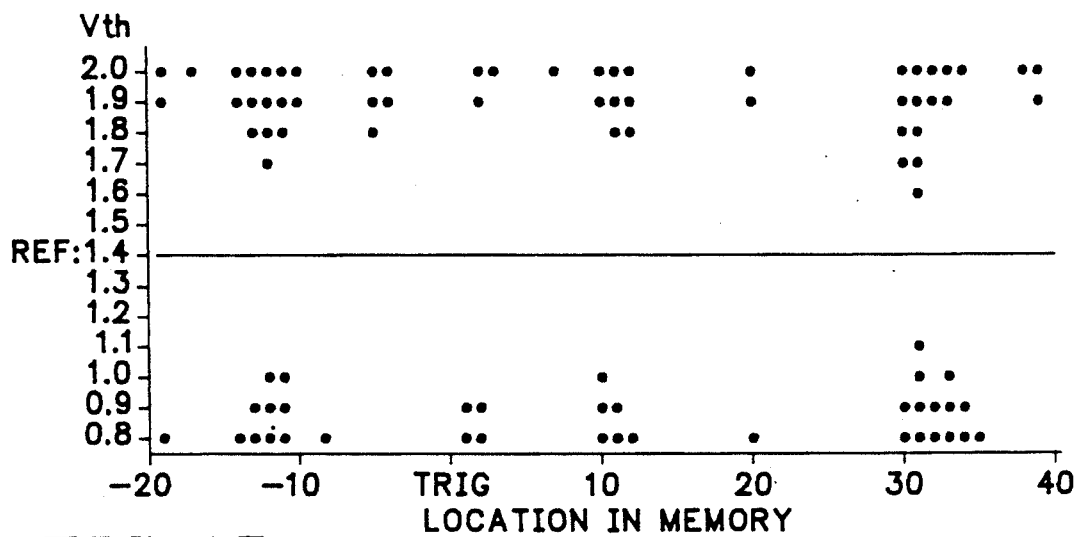
FIG. 4B is a plot of the distribution of detected anomalies at each of the variable voltage threshold levels versus their location in memory.
Figure 4C:
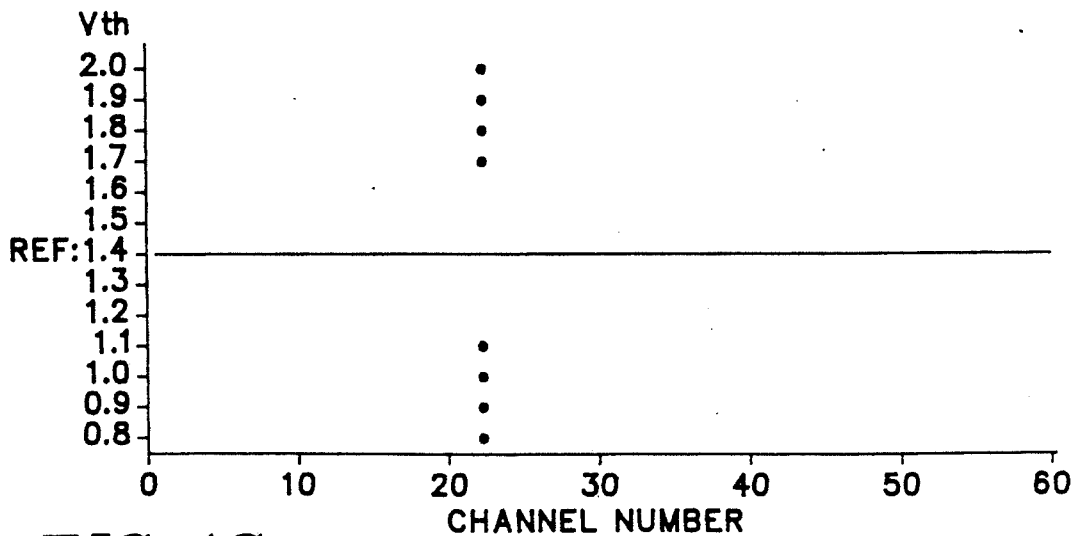

Once the data from this technique has been converted into information about which signal displayed which anomaly at which variable voltage threshold level, and at which location in memory the anomalous data occurred in the case of repetitive data, these results can be presented to the user of the instrument in a variety of ways, as shown in FIGS. 4A, 4B, and 4C.

FIG. 4A shows a histogram of the total number of anomalies as a function of the variable threshold voltage level. This example shows "ALL" selected as the anomaly type, but other selections available are: RISE TIME, FALL TIME, RISE AND FALL TIMES, NOISE, MARGINAL AMPLITUDE, and NARROW PULSE.

FIG. 4B shows a plot of the distribution of anomalies at each of the variable voltage threshold levels versus memory location. In this example NOISE has been selected as the subset of all of the detected anomalies to be displayed. It should be noted that this type of display wherein one of the axes is a time or memory location axis only has meaning for underlying data that is repetitive, at least in the region being used for triggering, since, if the data is not repetitive enough for stable triggering, there is no time reference available to make memory location a meaningful parameter.

FIG. 4C shows a plot of the distribution of anomalies encountered as a function of both the variable threshold voltages and the data channels that they occurred on. In this example only RISE TIME has been selected for display. This type of display is particularly useful for identifying specific channels as the source of a problem.

While a preferred embodiment of the present invention has been shown and described, it will be apparent to those skilled in the art that many changes and modifications may be made without departing from the invention in its broader aspects. The claims that follow are therefore intended to cover all such changes and modifications as fall within the true spirit and scope of the invention.

I claim:

1. A method for performing signal quality analysis on an input signal in a digital data acquisition instrument having a plurality of comparison thresholds, the method comprising the steps of:
   triggering data acquisition and acquiring reference data derived from the input signal using a reference comparison threshold;
   simultaneously acquiring variable data derived from the input signal using a variable comparison threshold;
   comparing the reference data and the variable data to determine if predetermined signal anomalies are present;
   varying the variable comparison threshold; and
   repeating the steps of triggering, acquiring, comparing and varying.

2. A method as recited in claim 1 wherein the comparing step comprises the steps of:
   noting all differences between the reference data and the variable data; and
   ignoring those differences that only change the position of edges in the reference data by a selected number of clock cycles or less.

3. A method as recited in claim 2 wherein the comparing step further comprises the step of labeling as an anomaly any differences not ignored.

4. A method as recited in claim 3 wherein the labeling step comprises the step of:
   identifying as noise pulses in the variable data that have no counterpart in the reference data.

5. A method as recited in claim 3 wherein the labeling step comprises the step of:
   identifying as slow rise and fall times edge position changes between the variable data and the reference data that exceed the selected number of clock cycles.

6. A method as recited in claim 3 wherein the labeling step comprises the step of:
   identifying as marginal amplitude any pulse that is present in the reference data but that is not present in the variable data.

7. A method as recited in claim 3 wherein the labeling step comprises the step of:
   identifying as a narrow pulse any pulse in either the variable data or the reference data that is less than a second selected number of clock cycles long.

8. A method as recited in claim 4 comprising the additional step of displaying for the user the labeled anomalies.

9. A method as recited in claim 5 comprising the additional step of displaying for the user the labeled anomalies.

10. A method as recited in claim 6 comprising the additional step of displaying for the user the labeled anomalies.

11. A method as recited in claim 7 comprising the additional step of displaying for the user the labeled anomalies.

12. A method as recited in claim 1 wherein the varying step comprises a binary search over a range of amplitudes between expected logic levels of a signal based on the results of the comparing step.

13. A method as recited in claim 1 wherein the varying step comprises a series of increments or decrements over a range of amplitudes between expected logic levels of a signal.

14. A method for performing signal quality analysis on an input signal in a digital data acquisition instrument having a plurality of comparison thresholds, the method comprising the steps of:
   triggering data acquisition and acquiring reference data derived from the input signal using a reference comparison threshold;
   simultaneously acquiring variable data derived from the input signal using a variable comparison threshold to form a data comparison pair;
   varying the variable comparison threshold; and repeating the steps of triggering, acquiring, and varying; and comparing the reference data and the variable data of each data comparison pair to determine if predetermined signal anomalies are present.

15. A method as recited in claim 14 wherein the comparing step comprises the steps of:

noting all differences between the reference data and the variable data; and ignoring those differences that only change the position of edges in the reference data by a selected number of clock cycles or less.

16. A method as recited in claim 15 wherein the comparing step further comprises the step of labeling as an anomaly any differences not ignored.

17. A method as recited in claim 16 wherein the labeling step comprises the step of:

identifying as noise pulses in the variable data that have no counterpart in the reference data.

18. A method as recited in claim 16 wherein the labeling step comprises the step of:

identifying as slow rise and fall times edge position changes between the variable data and the reference data that exceed the selected number of clock cycles.

19. A method as recited in claim 16 wherein the labeling step comprises the step of:

identifying as marginal amplitude any pulse that is present in the reference data but that is not present in the variable data.

20. A method as recited in claim 16 wherein the labeling step comprises the step of:

identifying as a narrow pulse any pulse in either the variable data or the reference data that is less than a second selected number of clock cycles long.

21. A method as recited in claim 17 comprising the additional step of displaying for the user the labeled anomalies.

22. A method as recited in claim 18 comprising the additional step of displaying for the user the labeled anomalies.

23. A method as recited in claim 19 comprising the additional step of displaying for the user the labeled anomalies.

24. A method as recited in claim 20 comprising the additional step of displaying for the user the labeled anomalies.

25. A method as recited in claim 14 wherein the varying step comprises a series of increments or decrements over a range of amplitudes between expected logic levels of a signal.

* * * * *